United States Patent
Sangha et al.

(10) Patent No.: US 11,605,995 B2
(45) Date of Patent: Mar. 14, 2023

(54) SPACER TO CONTROL OIL FLOW IN STATOR WINDING

(71) Applicant: Hamilton Sundstrand Corporation, Charlotte, NC (US)

(72) Inventors: Parminder Singh Sangha, Solihull (GB); Edward Graham Charles Pocock, Milton Keynes (GB); Michael Dawson, Tring (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 274 days.

(21) Appl. No.: 16/988,944

(22) Filed: Aug. 10, 2020

(65) Prior Publication Data

US 2021/0143701 A1    May 13, 2021

(30) Foreign Application Priority Data

Nov. 8, 2019 (EP) .................... 19275119

(51) Int. Cl.
*H02K 3/34* (2006.01)
*H02K 3/12* (2006.01)
*H02K 3/24* (2006.01)

(52) U.S. Cl.
CPC ............ *H02K 3/345* (2013.01); *H02K 3/12* (2013.01); *H02K 3/24* (2013.01)

(58) Field of Classification Search
CPC .. H02K 3/12; H02K 3/24; H02K 3/34; H02K 3/345; H02K 3/50; H02K 9/19; H02K 9/193; H02K 9/197
USPC ............ 310/52, 54, 58, 64, 179, 180, 215, 310/216.105, 216.115
See application file for complete search history.

(56) References Cited

U.S. PATENT DOCUMENTS

| | | |
|---|---|---|
| 2009/0096313 A1 | 4/2009 | Harada et al. |
| 2012/0256512 A1 | 10/2012 | Fubuki et al. |
| 2019/0109513 A1 | 4/2019 | Bethge et al. |
| 2019/0149023 A1 | 5/2019 | Weber |
| 2020/0014266 A1* | 1/2020 | Oechslen ............... H02K 9/197 |

(Continued)

FOREIGN PATENT DOCUMENTS

| | | |
|---|---|---|
| CH | 332979 A | 9/1958 |
| DE | 1017265 B | 10/1957 |

(Continued)

OTHER PUBLICATIONS

European Search Report for Application No. 19275119.6, dated Apr. 28, 2020, 79 pages.

*Primary Examiner* — Rashad H Johnson
(74) *Attorney, Agent, or Firm* — Cantor Colburn LLP

(57) ABSTRACT

A stator is described herein comprising a first longitudinally extending slot having a cavity defined by a first inwardly facing longitudinal surface and a second inwardly facing longitudinal surface; said stator further comprising a spacer provided in said cavity of said first slot, said spacer comprising a first spacer component that comprises a first sheet of material having a first sheet surface facing inwardly into said slot and an opposite sheet surface that is in contact with and extends along the first longitudinally extending inner surface of said slot and wherein said inwardly facing first sheet surface of said first spacer component comprises at least one ridge projection extending along its length L. Methods for assembling such stators are also described.

15 Claims, 7 Drawing Sheets

(56) References Cited

U.S. PATENT DOCUMENTS

| | | | |
|---|---|---|---|
| 2020/0169136 A1* | 5/2020 | Sercombe | H02K 1/278 |
| 2020/0259399 A1* | 8/2020 | Marvin | H02K 9/19 |
| 2020/0366150 A1* | 11/2020 | Walisko | H02K 3/24 |
| 2022/0200382 A1* | 6/2022 | Liu | H02K 3/345 |

FOREIGN PATENT DOCUMENTS

| | | |
|---|---|---|
| JP | S56141544 U | 10/1981 |
| JP | S61189153 A | 8/1986 |
| JP | H10257707 A | 9/1998 |
| JP | 2003070201 A | 3/2003 |
| JP | 2014179264 A | 9/2014 |
| JP | 5663191 B2 | 2/2015 |
| JP | 2016048989 A | 4/2016 |

* cited by examiner

SPACER TO CONTROL OIL FLOW IN STATOR WINDING

FOREIGN PRIORITY

This application claims priority to European Patent Application No. 19275119.6 filed Nov. 8, 2019, the entire contents of which is incorporated herein by reference.

FIELD OF TECHNOLOGY

The examples described herein relate to the field of stator windings and in particular methods and means of cooling the stator windings.

BACKGROUND OF THE INVENTION

Electric generators or motors comprise a stator and a rotor. To achieve high power density, liquid cooling needs to be applied to the stator to remove core losses and copper losses. For electric propulsion applications, liquid cooling makes the electric motor feasible from size and weight, however, the way in which the liquid cooling is applied on to the stator windings has a major impact on the thermal design of the motor. There is therefore a need for an improved method and system for cooling stator windings.

SUMMARY OF THE INVENTION

A stator is described herein comprising a first longitudinally extending slot having a cavity defined by a first inwardly facing longitudinal surface and a second inwardly facing longitudinal surface. The stator further comprises a spacer provided in said cavity of said first slot said spacer comprising a first spacer component that comprises a first sheet of material having a first sheet surface facing inwardly into said slot and an opposite sheet surface that is in contact with and extends along the first longitudinally extending inner surface of said slot. The inwardly facing first sheet surface of said first spacer component comprises at least one ridge projection extending along its length L.

In some examples described herein the inwardly facing first sheet surface of said first spacer component may comprise a plurality of said ridge projections extending along its length L.

In some examples described herein the stator may further comprise a second spacer component that comprises a second sheet of material having a first sheet surface facing inwardly into said slot and an opposite sheet surface that is in contact with and extends along the second longitudinally extending inner surface of said slot, so that said inwardly facing surfaces of said first and second spacer components face towards each other within said slot cavity.

In some examples described herein the inwardly facing first sheet surface of the second spacer component comprises at least one ridge projection extending along its length L.

In some examples described herein, the inwardly facing first sheet surface of said second spacer component may comprise a plurality of said ridge projections extending along its length L.

In some examples described herein the slot cavity may have a depth D extending from an entrance at a radially inward open end of said slot to a radially outward and closed end of said slot, the depth of the cavity extending from said radially inward open end of said slot to said radially outward closed end of said slot.

In some examples described herein a cross-sectional thickness of said first and/or second spacer component may decrease in a direction from said closed end of the slot cavity to said open end of said slot cavity.

In other examples the cross-sectional thickness of the first and/or second spacer component may remain constant in a direction from the closed end of the slot cavity to the open end of the slot cavity.

In some examples described herein the first and second components may not connected to each other.

In some examples described herein the first and second components may be connected to each other.

In some examples described herein the spacer may further comprise a third spacer component provided at said entrance of said slot.

In some examples described herein the third spacer component may comprise a ridge projecting inwardly into said slot.

In some examples a fourth spacer component may be provided that that is positioned between the first and second spacer components.

The four spacer components described herein may be used alone or together with any of the individual spacer components described herein. For example, a first and second spacer component may be used without the (third) bottom component, but with the (fourth) central component and vice versa. The numbering of the components is only used herein to distinguish the components from each other and does not indicate that they must be used together in any combination.

A method for assembling the stators described herein may comprise inserting the first and second spacer components into said slot of the stator and gluing the first and second spacer components into position within the slot and inserting a winding into said slot and between said spacer components.

A method for assembling the stators described herein may comprise pushing the first and second spacer components into a slot of the stator during or after inserting a winding into said slot and between said spacer components.

A method for assembling the stators described herein may comprise placing the spacer into a slot of the stator, and inserting a winding into said slot so that it is positioned between the first and second components.

A method for assembling the stators described herein may comprise gluing a first plurality of said spacer components into a first plurality of said slots of said stator and pushing a second plurality of spacers into a second plurality of slots of said stator.

BRIEF DESCRIPTION OF THE DRAWINGS

FIG. 6b shows a perspective view of the bottom spacer component of FIG. 6a.

DETAILED DESCRIPTION OF THE INVENTION

In a typical implementation of an electric propulsion motor, Litz or shaped bundles of conductors are used for the stator windings to reduce high frequency, circulating currents and proximity losses. The stator losses consist of core and copper losses, the copper losses being dominant. The most direct method of removing the copper loss is by applying flood cooling in the stator slots.

Directly flooding the stator winding with liquid cooling improves the motor power density of the motor. The heat transfer from the winding is greatly affected by the oil flow rate around the windings. The examples described herein therefore provide an improved means of directing this oil around the windings by providing a spacer in the slot of the stator. In some examples these may be wedge-shaped, although the examples are not limited to this. These spacers can be used to ensure that the conductors are placed and remain positioned near the central axis of the stator slots and control the oil paths and flow rate around the conductors. This results in lower winding temperatures for given stator winding losses.

The examples described herein are also able to control the volume and flow rate of oil in flood cooled stator windings to thereby improve thermal management. To make electric propulsion feasible in aircraft requires high power density of motors, drives, batteries and other mechanical components. The method of cooling is applicable to other applications where higher power density is required. To increase the power density of the motor requires minimization of the stator losses, the rotor losses and also improvements in the thermal management of the stator losses which are normally dominated by the copper loss.

To improve the heat transfer between the copper conductors and oil, it is important to control the volume of oil, its flow rate and to ensure that the cooling is applied across a large part of the conductor surface. To control the conductor position in the slot and to control the flow around the conductor, the examples described herein provide shaped spacers that can be installed in the slot of the machine as shown in FIGS. 1-6.

With appropriate spacer profiles it is possible to control the areas around the conductor where the oil can flow and control the minimum size of the oil channel around the conductors. Controlling the size of the flow channel helps to control the coolant velocity (and Reynolds/Nusselt Number). High coolant velocity improves the heat transfer rate between the copper and the coolant fluid. The spacers can also be used to control the radial position of different conductor bundles within the slot.

Figure 1:
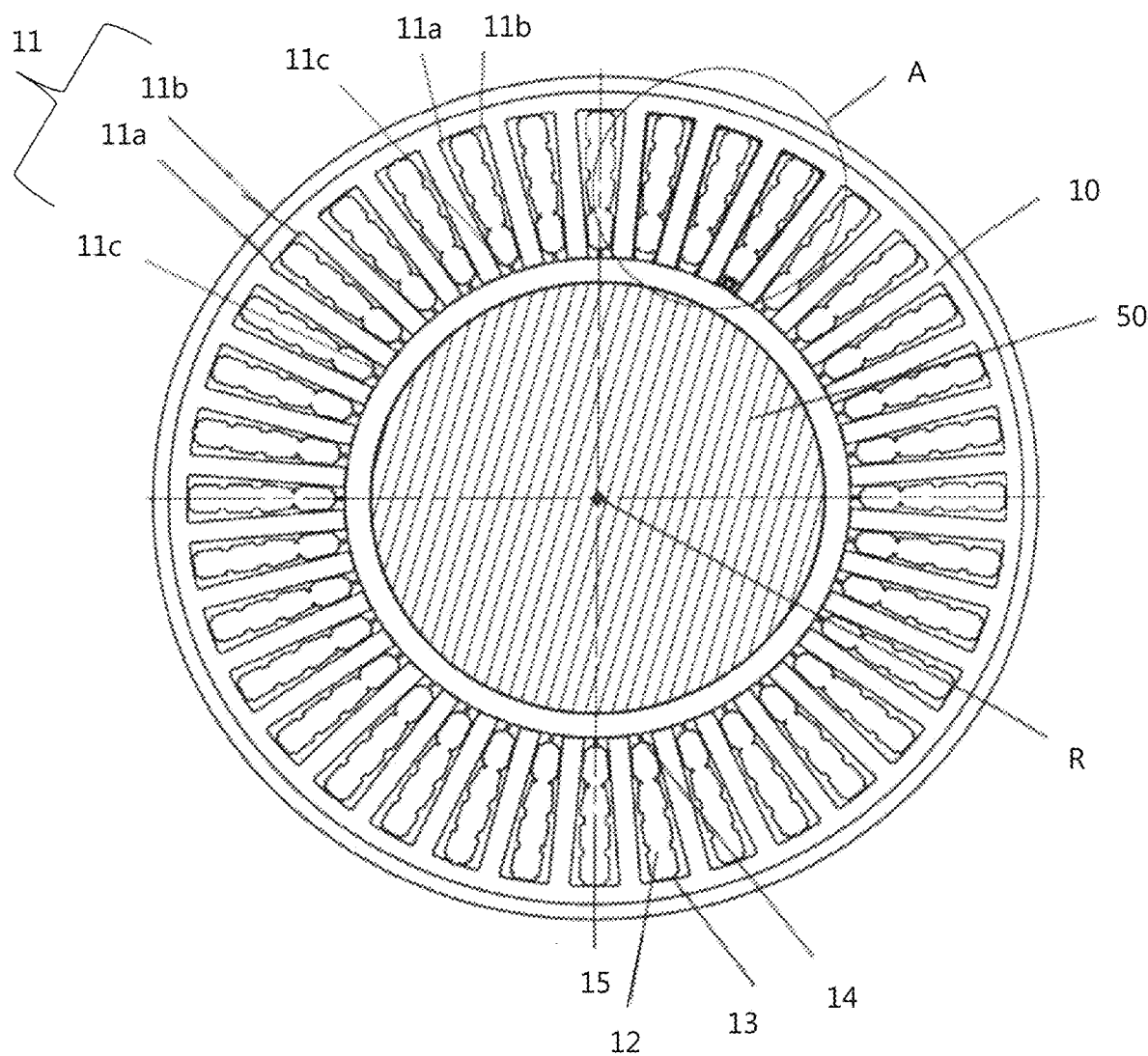
FIG. 1 shows a cross-sectional view of a stator with spacers provided in the slots of the stator.

FIG. 1 depicts a new type of motor comprising a stator 10 with profiled spacers 11 and a rotor 50 positioned within the stator 10. The stator body 10 extends circumferentially around the rotor 50 and around the central axis of rotation R of the rotor 50 as is known in the art.

In some examples the spacers 11 can be made as single, individual and distinct pieces that can be fixed to a slot liner (not shown in FIG. 1). In other examples the spacers 11 may be integrated with the slot liner to ease manufacturing of the insulation system and the windings (not shown in FIG. 1). In other examples the spacers 11 themselves act as a ground wall insulation and so it may be possible to eliminate the slot liner and use the spacer 11 as the ground wall insulation.

The spacers 11 described herein are able to avoid damage to the wire or slot liners by spreading load from bending wires away from the hard edges of the metal corepack and onto a larger area. Creating individual spaces for the wires also eases and orders the winding process.

Figure 2:
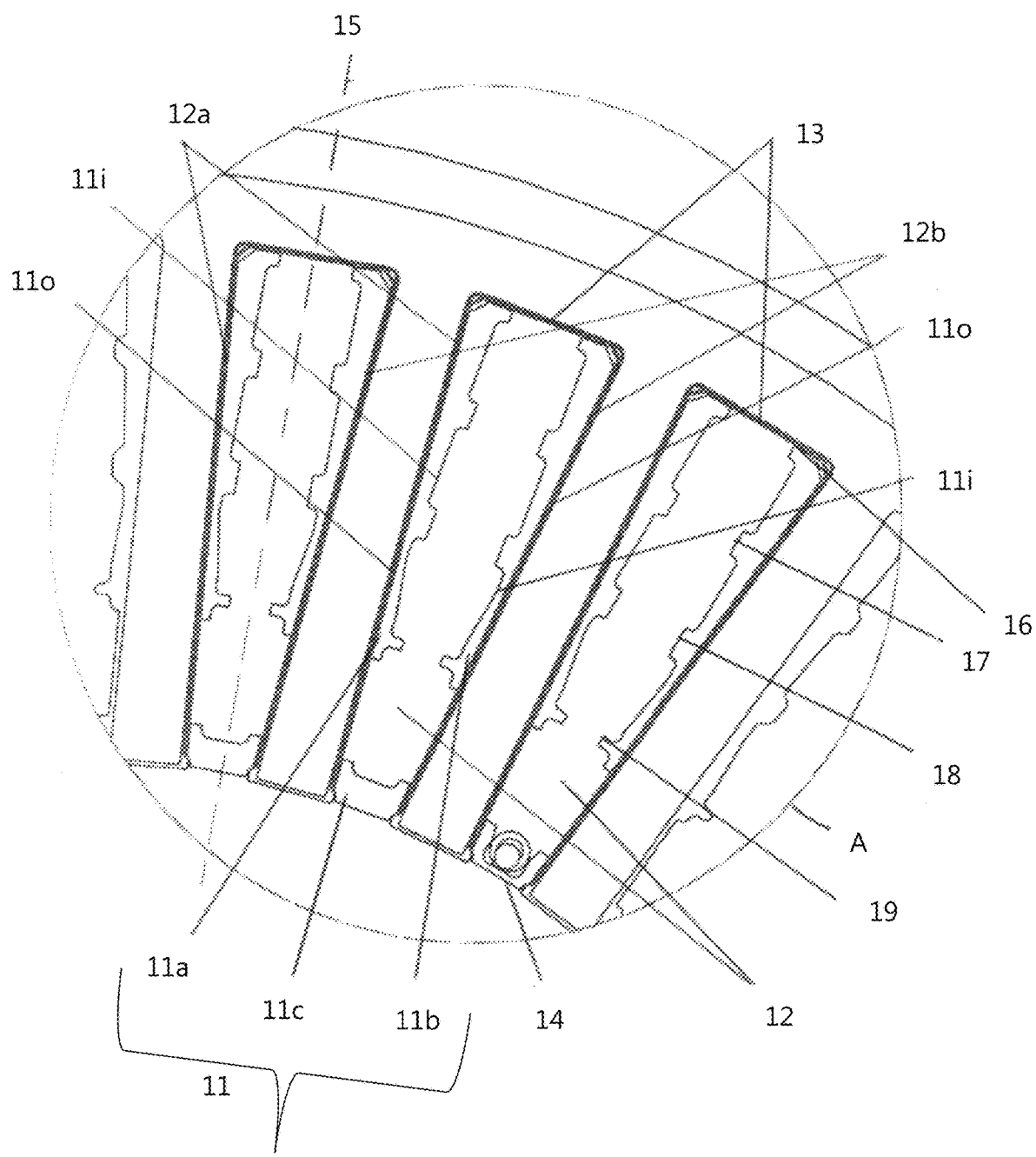
FIG. 2 shows an enlarged section A of FIG. 1.

FIG. 2 depicts an enlarged section A of FIG. 1. As can be seen in this figure, each slot 12 may contain a spacer 11 which in these examples essentially comprises three individual parts, i.e. spacer components 11a, 11b and 11c. The slot spacer components 11a and 11b are positioned against the internal walls 12a, 12b of the slot 12 which define a cavity in the slot 12 and are profiled such that their outer surface 11o which is in contact with the inner surface 12a of the slot 12 is flush with the inner surface 12a of the slot 12 along the spacer component 11a, 11b and slot 12 internal length L (shown in FIG. 5c).

For example, the stator 10 can be described as having a first (or a plurality of) longitudinally extending open-ended slot 12 (in FIG. 1 the slot extends longitudinally in a direction parallel to the rotation axis R and perpendicular to the page surface). The slot 12 has a cavity defined by a first inwardly facing longitudinal surface 12a and a second inwardly facing longitudinal surface 12b.

The spacer 11 is provided in the cavity of the slot 12 and in some examples the spacer 10 comprises a first spacer component 11a that essentially comprises a first sheet of material having a first sheet surface 11i, that when positioned in the slot faces inwardly into said slot 12 and an opposite sheet surface 11o that is in contact with and extends along the first longitudinally extending inner surface 12a of said slot 12.

Figure 5A:
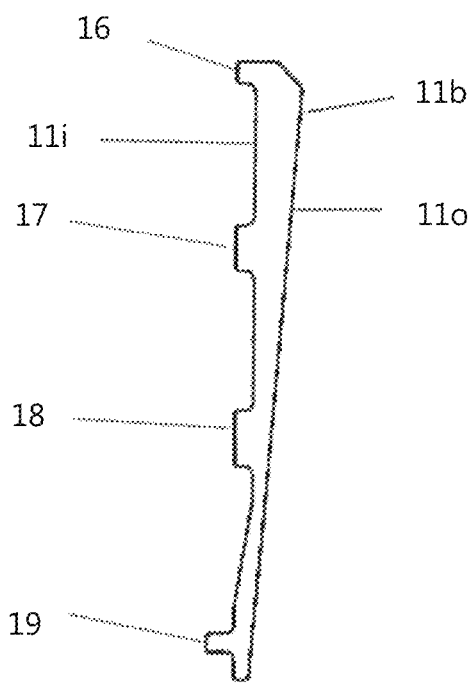
FIG. 5a shows an example of a side view of a spacer component.
Figure 5B:
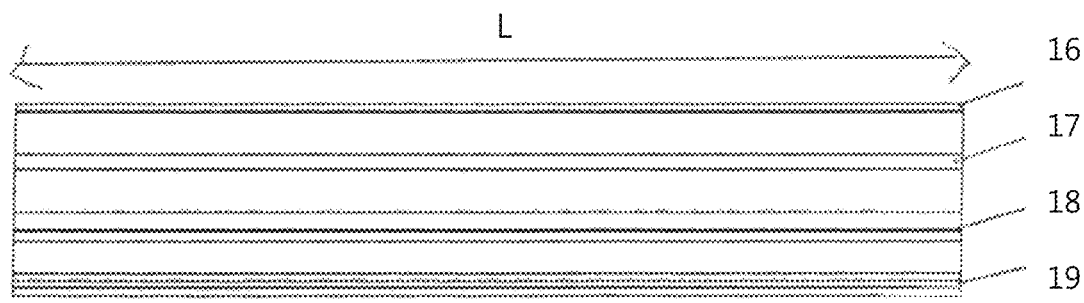
FIG. 5b shows a perspective view of a spacer component.
Figure 5C:
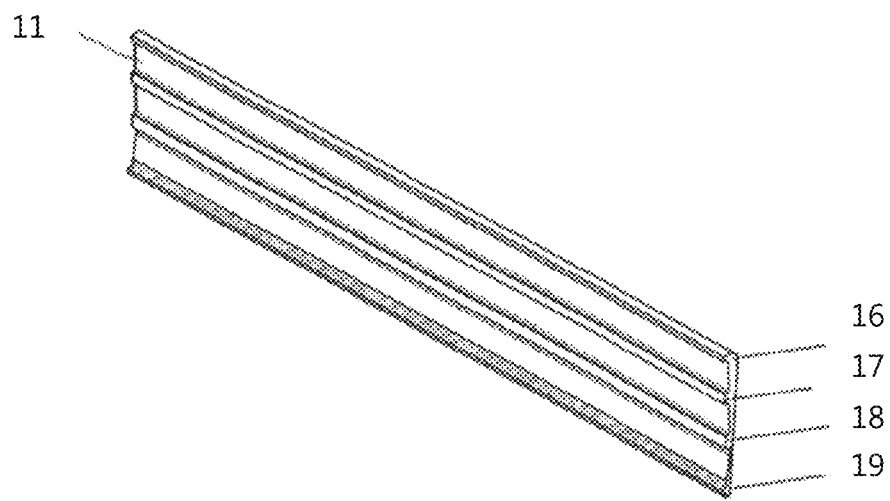
FIG. 5c shows a top view of a spacer component.

The inwardly facing surface 11i of the first spacer component 11a comprises at least one ridge projection 16, 17, 18, 19 extending along its length L as shown in FIGS. 5a to 5c.

A second spacer component 11b may also be provided in the slot cavity and so these components may then be positioned in this way in the slot 12 so that the inwardly facing surface 11i of the first spacer component 11 a faces the inwardly facing surface 11i of the second spacer component 11b. A cross-sectional view of one component 11b is shown in FIG. 5a.

As shown in FIGS. 5a and 5b these spacers 11a, 11b may comprise elongated sheets which extend longitudinally along an internal length L within the stator slot 12 in a direction that is parallel to the central axis of rotation when positioned within the slot 12. The spacers may be shaped so as to have a wedge-shaped cross-section as shown in FIGS. 1 and 2. That is, the thickness of the spacer component 11a, 11b may taper and decrease as it extends from the closed end 13 of the slot 12 to its more radially inward open end 14, the second end 14 being radially closer to the center of the stator 10 (and rotor central rotation of axis R) when positioned therein.

As mentioned above, the spacers 11a, 11b have an inwardly facing surface 11i that comprises one or more ridged projections 16, 17, 18, 19 extending along the length L of the spacer 11 and also project inwardly towards the central slot axis 15 of the slot 12. The central slot axis 15 of each slot 12 extends perpendicularly to the central axis of rotation R as shown in FIG. 1. FIGS. 5b and 5c depict these ridged projections in more detail. Although in the examples shown herein the spacer components 11a, 11b comprise four ridged projections the examples are not limited to this and other numbers of ridged projections can be used.

In this example the ridges 16, 17, 18, 19 are prismatic shaped ridges. In other examples the ridges may be non-prismatic and/or may be castellated and/or may be configured to cause the oil to take a winding S shape path to increase turbulence.

Figure 3:
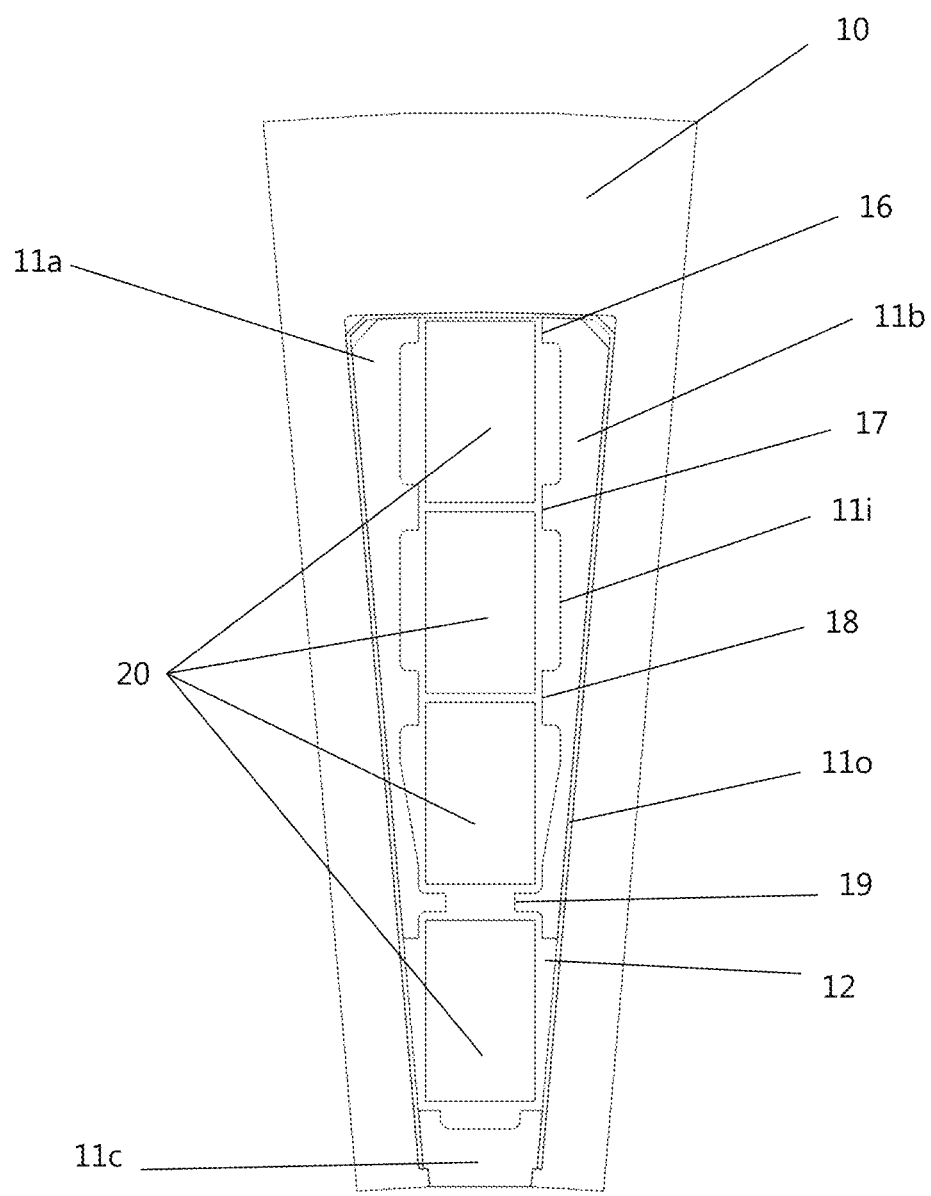
FIG. 3 shows a stator slot with conductors and a spacer provided therein.

In use, the ridged projections 16, 17, 18, 19 are able to contact/hold in place the conductors 20 which are positioned between the spacers 11a, 11b as shown in FIG. 3. In these examples a single column of conductors is provided, however, more than one column of conductors may be used in some examples, such as that shown in FIG. 7a. Since some clearance is required in order to allow the wire to be fed into and through the slot 12, the wire may in some cases only be in contact with either spacer 11a or 11b and not necessarily be in contact with both spacers in one slot 12. In some situations, the winding may cause the wire to alter its shape during use.

Figure 6A:
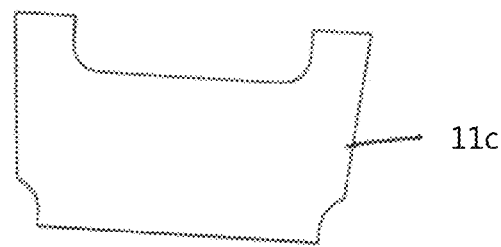
FIG. 6a shows an end/cross-sectional view of a bottom spacer component.
Figure 6B:
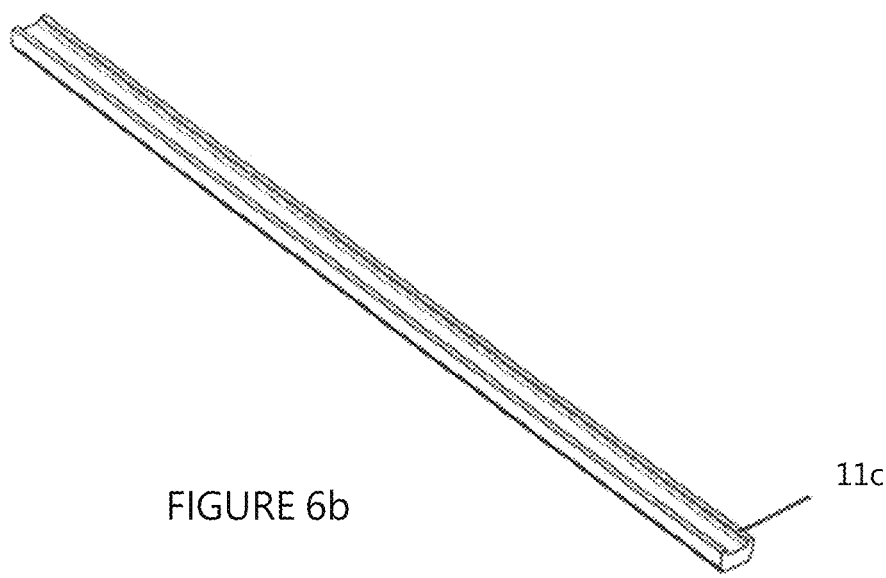
Figure 6C:
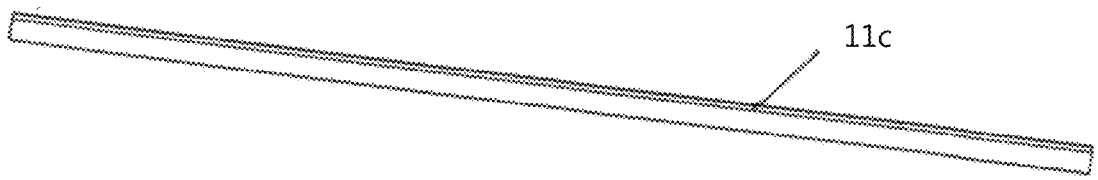
FIG. 6c shows a side view of the bottom spacer component of FIGS. 6a and 6b.

In some examples the spacers 11 also comprise a third spacer component 11c, which is the "bottom" component of the spacer 11. This is shown in FIGS. 6a to 6c wherein FIG. 6a shows an end, cross-sectional view of the bottom spacer component 11c, FIG. 6b shows a perspective view of the bottom spacer component 11c and FIG. 6c shows a side, longitudinal view of the bottom spacer component of FIGS. 6a and 6b.

That is, the third spacer may be positioned within the slot 12 so as to be radially further inward than the first and second components 11a, 11b, as shown in FIGS. 2 and 3. The third spacer component 11c is positioned at the open end/entrance to the open-ended slot 12. The third component 11c is shown in more detail in FIGS. 6a to 6c and may have a U-shaped cross section. The bottom part of the U-shape would be positioned radially inward so that the arms of the U shape extend into the slot cavity. The third component 11c may also extend longitudinally along the open end/entrance to the elongated open-ended slot 12.

In some examples the third spacer 11c may be necessary because the spacer components 11a, 11b may be too thin to manufacture as the width between the wire and the slot 12 reduces. This third spacer component 11c is configured to function in combination with the first and second spacer components 11, 11b to provide "top and bottom" cooling of the slot 12 as opposed to "side cooling" on the upper wires. In other examples, however, the spacer components 11a, 11b may be modified so that they also provide top and bottom cooling to other wires via a different layout.

In stators 10 wherein the slots 12 have a layout providing more space than in the ones shown in FIGS. 1 and 2, the third spacer component 11c may not be necessary. For example, if only the top three wires/conductors 20 of FIG. 3 were to be present then the third spacer 11c provided at the entrance to the slot 12 may not be necessary.

In examples wherein the third component 11c is provided, the third component may use inwardly facing protrusions or ridges in the same way that the second and third components use such protrusions or ridges. These protrusions/ridges create oil channels in the same way the protrusions in the first and second components provide oil channels.

The height of the third component 11c and the depth at which it extends internally into the slot 12 allows for the bottom most wire/conductor 20 to be correctly positioned in the slot so that its oil channels can be influenced by the first and second components 11a, 11b.

Figure 4A:
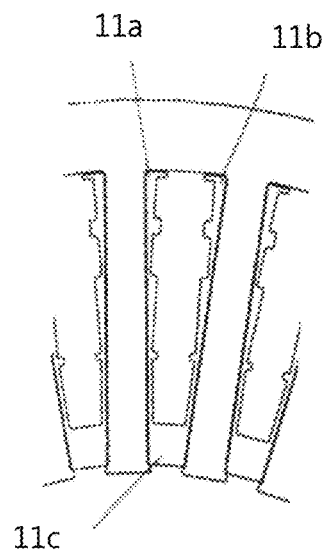
FIG. 4a shows an example a profiled shape of a spacer.
Figure 4B:
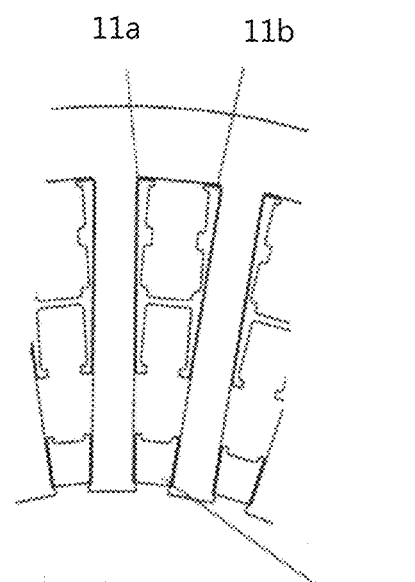
FIG. 4b shows a further example a profiled shape of a spacer.
Figure 4C:
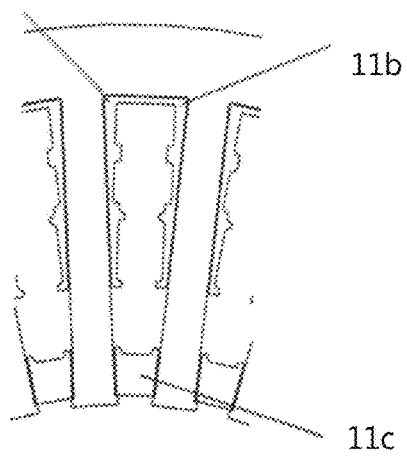
FIG. 4c shows a further example a profiled shape of a spacer.

FIGS. 4a to 4c depict other examples of profiled spacers 11. In these examples the spacers are self-supporting and the first and second components 11a, 11b are connected and formed as one piece. The amount of components/spacers within the slot is not predetermined and could vary from one to many.

In FIG. 4a the components 11a, 11b are connected to each other via the third component 11c provided at a position radially inwardly of the slot 12, i.e. at the open end 14 of the slot 12. In FIG. 4b the components are connected at a position approximately midway along the length of the first and second components 11a, 11b. In the example shown in FIG. 4c the components 11a, 11b are connected at a point radially outwardly of the slot 12, i.e. at the closed end 13 of the slot 12.

Figure 7A:
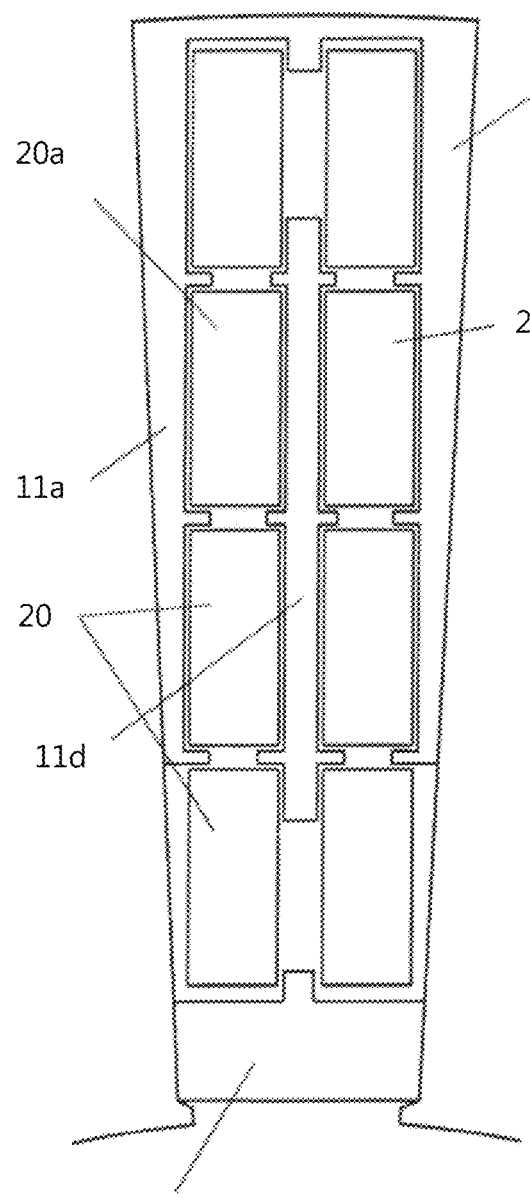
FIG. 7a shows an example of a spacer wherein a fourth spacer component is provided.
Figure 7B:
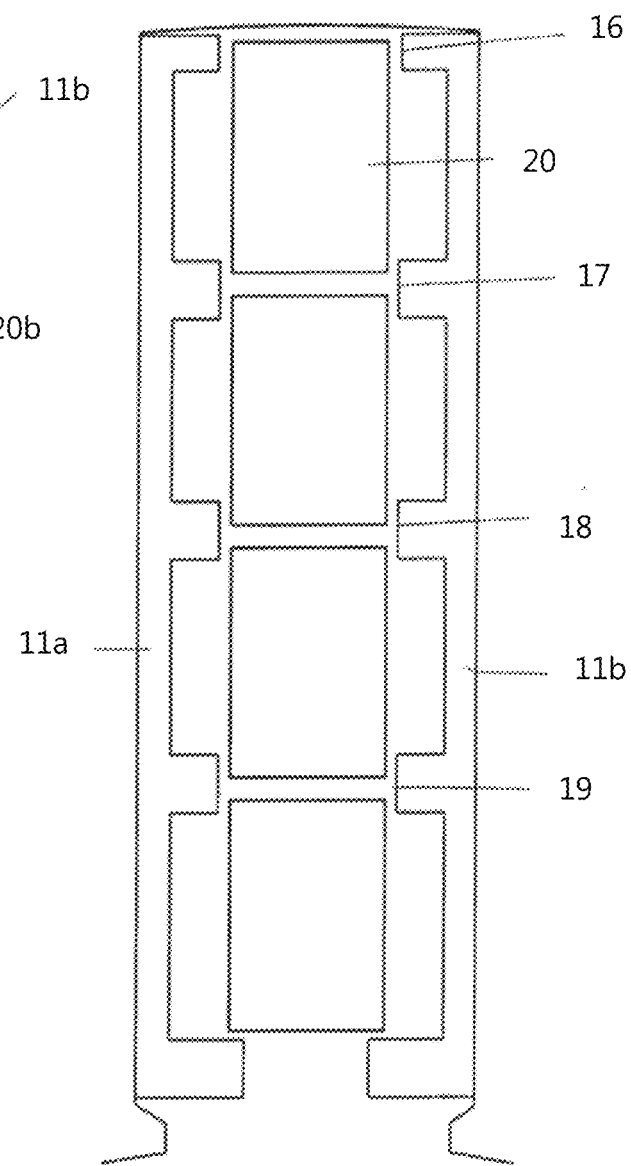
FIG. 7b shows an example of a spacer that fits into a rectangular shaped slot of a stator.

FIGS. 7a and 7b show other alternative spacer component configurations. FIG. 7a shows a configuration wherein a fourth spacer component 11d is provided. Although in this figure the first and second components 11a, 11b are formed as one piece, this is not necessary and they may also be provided as separate components, as described above. In this example, two columns of conductors are provided and this fourth component 11d may be provided in the center of the slot so that a first conductor 20a (from the first column) is positioned/sandwiched between the inner surface 11i of the first component 11a and a first side of the inner component 11d and a second conductor 20b (from the second column) is positioned/sandwiched between the opposite side of the inner component 11d and the inner surface 11i of the second component 11b as shown in FIG. 7a. This configuration has the advantage that it provides cooling in the center of the slot as well as at the sides and ends.

FIG. 7b shows another configuration that may be envisaged. In contrast to the examples shown in FIGS. 1 to 4c, wherein the stator slot is wedge-shaped, or trapezoidal in shape, in this example the slot 12 is rectangular in shape and so the first and second components 11a, 11b are not shaped so as to taper in the direction of the open end 14 of the slot 12, as described above. In this example, the thickness of the first and second components 11a, 11b remains relatively constant.

The four spacer components described herein may be used alone or together with any of the individual spacer components described herein. For example, a first and second spacer component may be used without the (third) bottom component, but with the (fourth) central component and vice versa. Additionally, the features shown in the examples having a constant cross-sectional thickness may also include the features of the examples having a tapered cross-sectional thickness and vice versa.

There are several ways the spacer components 11a and 11b can be assembled inside the slots 12 of the stator 10. One method is to insert the spacers 11a and 11b into the slot 12 and glue the spacers 11a, 11b into position prior to inserting any winding.

Another method comprises pushing the spacers 11a, 11b into the slot 12 after or during the winding.

In some examples wherein the spacer shape is self-supporting, such as the example shown in FIG. 4, the spacers 11a, 11b can be placed in the slot 12 prior to any winding.

In some examples, the spacers 11a, 11b may be inserted and positioned in place via a combination of assembling some spacer components prior to winding and some spacer components after or during winding. For example, the top spacers could be glued into place before winding and then bottom spacers pushed into place and vice versa.

The examples described herein provide many advantages over known spacers for stators and methods for making the same. For example, they allow for a much simpler method of positioning the conductor bundle near the middle of the slot of the stator 10.

The examples also provide an improved means of controlling the volume of oil and oil velocity around the conductor surface. The surface around the conductor where the cooling is being applied is also better and more easily controlled.

The examples also provide for integration of the slot liner and the spacer functionality. The spacers also act as an assembly guide/aid for winders as well as protecting stator components from damage.

The examples also act as a guide or aid for the winders, thereby easing assembly. They also act to protect the stator components from damage.

In some examples wherein the spacers 11 are made from a high thermal conductivity material, the spacers provide a better means of heat transfer between the copper and the core.

The examples descried herein may be used in aircraft electric propulsion applications. Other applications where a motor is flood controlled are, however, also envisaged and the examples are not limited to this.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A stator comprising:
   a first longitudinally extending slot having a cavity defined by a first inwardly facing longitudinal surface and a second inwardly facing longitudinal surface; and
   a spacer provided in said cavity of said first longitudinally extending slot, said spacer comprising:
      a first spacer component that comprises:
         a first sheet of material comprising:
            a first sheet surface facing inwardly into said slot; and
            an opposite sheet surface that is in contact with and extends along the first longitudinally extending inner surface of said longitudinally extending slot;
         wherein said inwardly facing first sheet surface of said first spacer component comprises at least one ridge projection extending along its length L;
      wherein said spacer further comprises a U-shaped spacer component provided at said entrance of said slot.

2. The stator of claim 1, wherein said inwardly facing first sheet surface of said first spacer component comprises a plurality of said ridge projections extending along its length L.

3. The stator of claim 1, further comprising:
   a second spacer component that comprises:
      a second sheet of material comprising:
         a first sheet surface facing inwardly into said slot; and
         an opposite sheet surface that is in contact with and extends along the second longitudinally extending inner surface of said slot, so that said inwardly facing surfaces of said first and second spacer components face towards each other within said slot cavity.

4. The stator of claim 3, wherein said inwardly facing first sheet surface of said second spacer component comprises at least one ridge projection extending along its length L.

5. The stator of claim 4, wherein said inwardly facing first sheet surface of said second spacer component comprises a plurality of said ridge projections extending along its length L.

6. The stator of claim 3, wherein said first and second components are not connected to each other.

7. The stator of claim 3, wherein said first and second components are connected to each other.

8. The stator of claim 3, further comprising a spacer component that is positioned between said first and second spacer components.

9. A method for assembling the stator of claim 3, comprising:
   placing the spacer into a slot of the stator; and
   inserting a winding into said slot so that it is positioned between the first and second components.

10. A method for claim 9, further comprising:
    gluing the first and second spacer components into position within the slot.

11. A method for assembling the stator of claim 3, comprising:
    pushing the first and second spacer components into the slot of the stator during or after inserting a winding into said slot and between said spacer components.

12. The stator of claim 1, wherein said slot cavity has a depth D extending from an entrance at a radially inward and open end of said slot to a radially outward and closed end of said slot, the depth of the cavity extending from said radially inward open end of said slot to said radially outward, closed end of said slot.

13. The stator of claim 12, wherein a cross-sectional thickness of said first and/or second spacer component decreases in a direction from said closed end of the slot cavity to said open end of said slot cavity.

14. The stator of claim 1, wherein said U-shaped spacer component comprises a ridge projecting inwardly into said slot.

15. The stator of claim 1, wherein said at least on ridge projection is non-prismatic and/or castellated.

* * * * *